(12) United States Patent
Kawabe

(10) Patent No.: US 11,475,228 B2
(45) Date of Patent: Oct. 18, 2022

(54) WIRELESS TAG READER

(71) Applicant: TOSHIBA TEC KABUSHIKI KAISHA, Tokyo (JP)

(72) Inventor: Yuichiro Kawabe, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/152,500

(22) Filed: Jan. 19, 2021

(65) Prior Publication Data

US 2021/0294991 A1    Sep. 23, 2021

(30) Foreign Application Priority Data

Mar. 18, 2020    (JP) .............................. JP2020-047849

(51) Int. Cl.
*G06K 7/08* (2006.01)
*G06K 7/10* (2006.01)

(52) U.S. Cl.
CPC ..... *G06K 7/10297* (2013.01); *G06K 7/10316* (2013.01); *G06K 7/10425* (2013.01); *G06K 2007/10504* (2013.01)

(58) Field of Classification Search
CPC ........... G06K 7/10297; G06K 7/10316; G06K 7/10425
USPC ........................................................ 235/451
See application file for complete search history.

(56) References Cited

U.S. PATENT DOCUMENTS

| 7,922,084 | B2 * | 4/2011 | Ishibashi .................. G07C 9/27 235/382 |
| 10,930,102 | B2 * | 2/2021 | Khojastepour .... G06K 7/10425 |
| 2005/0156806 | A1 | 7/2005 | Ohta et al. |
| 2007/0273529 | A1 * | 11/2007 | Lee ....................... H01Q 1/2216 340/572.7 |
| 2011/0095892 | A1 | 4/2011 | Hong et al. |
| 2011/0234463 | A1 * | 9/2011 | Lankes ................. H01Q 21/065 343/728 |
| 2013/0120108 | A1 * | 5/2013 | Kocznar .................. E05F 15/74 340/5.7 |
| 2016/0268695 | A1 | 9/2016 | Zavrel, Jr. |
| 2018/0144563 | A1 * | 5/2018 | Reymann ................ E06B 11/02 |

FOREIGN PATENT DOCUMENTS

| JP | 2010056780 A | 3/2010 |
| WO | 2007052371 A1 | 5/2007 |

OTHER PUBLICATIONS

European Search Report dated Jul. 20, 2021, mailed in counterpart European Application No. 21161734.5, 15 pages.

* cited by examiner

*Primary Examiner* — Ahshik Kim
(74) *Attorney, Agent, or Firm* — Kim & Stewart LLP

(57) ABSTRACT

According to one or more embodiments, a wireless tag reader includes a first shield member, a second shield member, an antenna, and a reader. The first and second shield members face each other across a reading area through which a wireless tag can pass. Each of the first and second shield members has a reflective surface that reflects a radio wave incident thereon toward the reading area. The antenna is between the reading area and the reflective surface of one of the first and second shield members. The antenna radiates and receives radio waves to communicate with the wireless tag. The reader reads data stored in the wireless tag based on radio waves received from the wireless tag by the antenna.

20 Claims, 7 Drawing Sheets

WIRELESS TAG READER

CROSS-REFERENCE TO RELATED APPLICATIONS

This application is based upon and claims the benefit of priority from Japanese Patent Application No. 2020-047849, filed on Mar. 18, 2020, the entire contents of which are incorporated herein by reference.

FIELD

Embodiments described herein relate generally to a wireless tag reader.

BACKGROUND

Conventionally, there is a wireless tag reader that reads a wireless tag or electronic tag, such as a radio frequency identification (RFID) tag. Such a tag can be attached to an item, article, product, or the like. In some instances, a tagged item, article, product, or the like can be passed through a gate equipped with an antenna that communicates with the wireless tag on the item.

Thus, an area for reading the wireless tag is formed in the region of the gate. The antenna of the wireless tag reader radiates a radio wave into the reading area for reading the wireless tag(s) in the reading area. By increasing output intensity of the radio wave that is radiated from the antenna, a reading success rate for the wireless tags passing through the gate can be improved.

However, since the radio wave radiated from the antenna may leak beyond the gate outside of the reading area, there is a potential problem in that a wireless tag on an article not being passed through the gate might be unintentionally read by the wireless tag reader. In addition, when the intensity of the radio wave radiated from the antenna is increased, the readable range of wireless tags may expand beyond the intended area. Consequently, tag misreading increases and the reading success rate decreases.

Therefore, reducing leakage of radio waves to the outside of an intended tag reading area is desired.

DETAILED DESCRIPTION

According to one or more embodiments, a wireless tag reader includes a first shield member, a second shield member, an antenna, and a reader. The first and second shield members face each other across a reading area through which a wireless tag can pass. Each of the first and second shield members includes a reflective surface that reflects a radio wave incident thereon toward the reading area. The antenna is between the reading area and the reflective surface of one of the first and second shield members. The antenna radiates and receives radio waves to communicate with the wireless tag in the reading area. The reader reads data stored in the wireless tag based on the radio waves received from the wireless tag by the antenna.

Hereinafter, certain example embodiments will be described with reference to the accompanying drawings.

In the example embodiments, a wireless tag reader is applied to a wireless tag gate that reads information stored in a wireless tag or an electronic tag, such as an RFID tag, when the tag or, more particularly, the article to which the tag is attached, passes through the gate. The application of the wireless tag reader, however, is not limited to such a case.

First Embodiment

Figure 1:
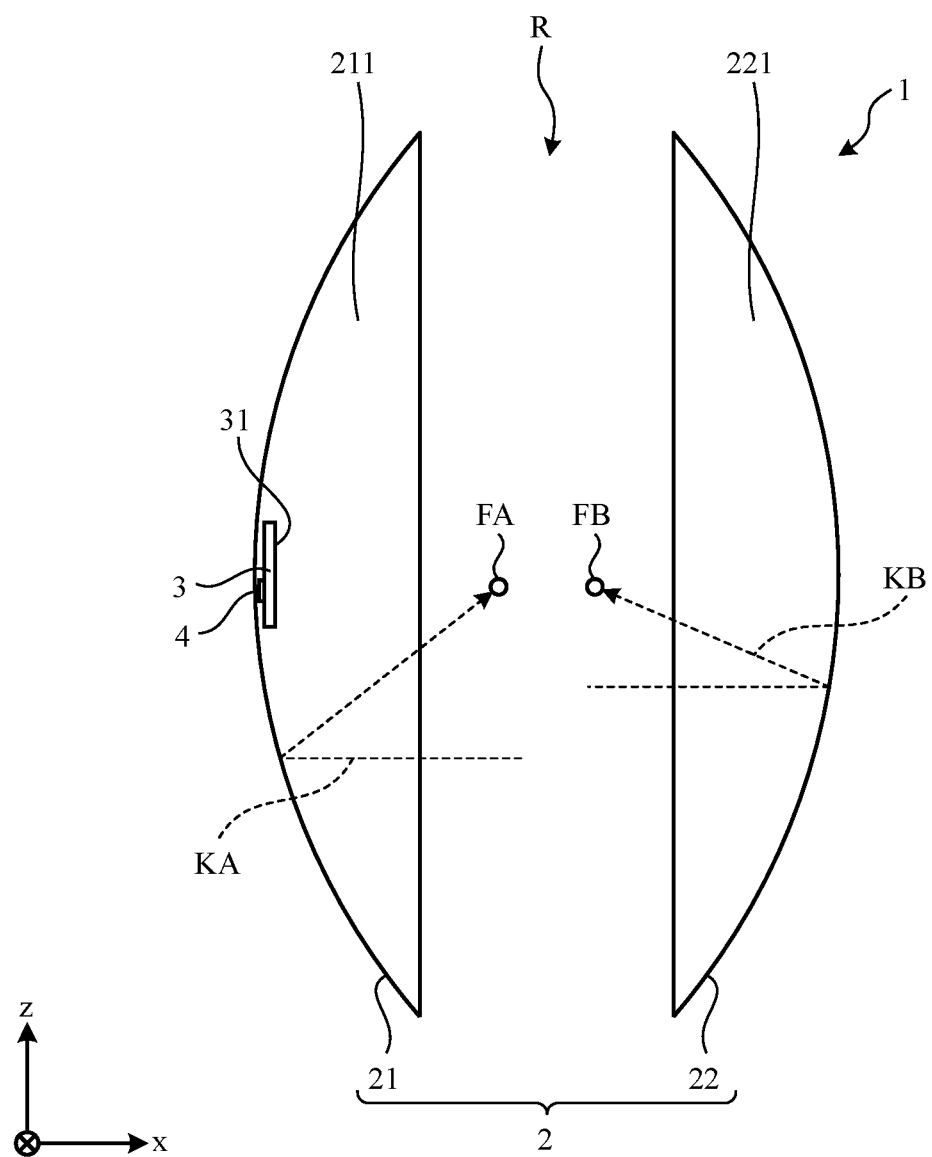
FIG. 1 depicts a wireless tag reader in a cross-sectional view according to a first embodiment.

FIG. 1 depicts an example configuration of a wireless tag reader 1 in a cross-sectional view according to a first embodiment.

As shown in FIG. 1, the wireless tag reader 1 includes a pair of shield members 2, an antenna 3, and a read module (reader) 4. The pair of shield members 2 form an aisle (also referred to as a gate or a gateway) therebetween through which a wireless tag passes. In this example, the wireless tag is attached to an article which is being managed in an inventory management scheme, system, or the like that can be utilized to monitor or track articles leaving a managed location. For example, the shield members 2 are arranged facing each other with a space therebetween to form a gateway (aisle) through which a commodity passes. In the following description, an area within the aisle between the shield members 2 is referred to as a reading area R (or reading region R). The reading area R is thus provided between the pair of shield members or the first and second shield members 2.

The wireless tag reader 1 may be installed, for example, in a warehouse for shipping commodities or a store for selling commodities. In such a scenario, a wireless tag is attached to each of commodities, articles or items that are managed at a warehouse, a store, or the like.

The wireless tag includes a tag antenna and a storage unit. The wireless tag generates power when the tag antenna receives a radio wave radiated from the antenna 3 of the wireless tag reader 1 and transmits information stored in the storage unit to the antenna 3 by the generated power.

Such information identifies an article to which the wireless tag is attached (herein may also be referred to as a tag-attached or tag-installed article). The wireless tag has, for example, an adhesive surface, and is attached to the article with an adhesive force. The wireless tag may be attached to an article with a band or the like.

The wireless tag reader 1 receives the radio wave emitted from the wireless tag while the wireless tag or the tag-attached article passes through the reading area R in the aisle of the gate. For example, the tag-attached article passes through the reading area R in a state of being held by a person or in a state of being placed in a cart, a movable table, a basket, a cardboard box, or the like. The information of the wireless tag received by the wireless tag reader 1 is transmitted to a server (not separately depicted) that is separately installed and manages carrying-out and carrying-in of articles, commodities, or the like stored in a warehouse, a store, or the like. For example, the server updates information of the articles stored in the warehouse based on the received information of the wireless tag.

The wireless tag reader 1 according to the present embodiment may be applicable to, for example, a device that reads a wireless tag attached to an article being conveyed on a belt conveyor. The wireless tag reader according to the present embodiment may also be applied to, for example, a box-shaped reader that accommodates a tag-attached article.

Each of the shield members 2 has a concave reflective surface capable of reflecting a radio wave (or radio waves).

The concave reflective surfaces are arranged so that the radio waves incident thereon are reflected toward a predetermined region (or regions) within the reading area R in the aisle of the gate. In the example configuration as shown in FIG. 1, the shield members 2 face each other with the reading area R interposed therebetween, and a first concave reflective surface 211 and a second concave reflective surface 221 are provided on the respective sides of the reading area R. The first and second concave reflective surfaces (herein may also be referred to as first and second reflective surfaces) 211 and 221 each reflect incident radio waves toward the respective predetermined regions within the reading area R.

As shown in FIG. 1, each of the shield members 2 includes a first shield plate 21 and a second shield plate 22. Each of the first and second shield plates 21 and 22 is a plate-like member formed in a concave shape that opens toward the reading area R.

The concave shape is, for example, a parabola shape. The concave shape may be another shape such as a quadrangular pyramid or a shape of a part of a cone. As the first and second shield plates 21 and 22, for example, metal plates are used. The first and second shield plates 21 and 22 may be made of a material other than metal as long as the material reflects radio waves.

The first and second shield plates 21 and 22 may comprise multiple layers of different materials, some of which reflect radio waves and some which do not. For example, a layer reflecting radio waves, such as a metal film, can be formed on the surface of a concave member formed of a material that does not reflect radio waves.

The first reflective surface 211 and the second reflective surface 221 each reflect the incident radio waves toward the respective predetermined regions in the reading area R. For example, the radio wave reflected by the first reflective surface 211 irradiates a first predetermined region in the reading area R. The radio wave reflected by the second reflective surface 221 irradiates a second predetermined region in the reading area R. Thus, each of the first shield plate 21 and the second shield plate 22 may be reflective plates. The pair of shield members 2 may thus be referred to as a pair of reflective members in some instances.

As shown in FIG. 1, when the first shield plate 21 and the second shield plate 22 are parabolic shapes, the shield members 2 are arranged such that a first focus point FA of the first shield plate 21 and a second focus point FB of the second shield plate 22 are located inside the reading area R in the aisle. In such an arrangement, the radio waves (as indicated by an arrow KA) incident on the first reflective surface 211 in parallel with the axis of symmetry of the parabolic surface of the first reflective surface 211 are reflected the first focus point FA. The radio waves (as indicated by an arrow KB) incident on the second reflective surface 221 in parallel with the axis of symmetry of the parabolic surface of the second reflective surface 221 are reflected toward the second focus point FB. The predetermined regions are thus defined in this context by reference to the first focus point FA and the second focus point FB.

The radio waves reflected by the shield members 2 include those from the antenna 3. The radio waves reflected by the shield members 2 may also include radio waves emitted from the wireless tag in response to the radio waves from the antenna 3. The radio waves reflected by a shield member 2 may further include radio waves reflected by the other one of the shield members 2 or any other reflective surface or plate.

In some examples, the first focus point FA may coincide with the first focus point FB in the reading area R. In such a case, it is possible to improve the radio wave intensity at the position where the focus points FA and FB coincide. In other examples, the first focus point FA and the second focus point FB do not coincide with each other. In this case, the size of the predetermined region with high radio wave intensity can be enlarged within the reading area R.

The predetermined region may be located at or near the center of the aisle, and the radio waves can be concentrated in the predetermined region at or near the center of the aisle by reflections from the shield members 2. Thus, the shield members 2 can be used to define the effective range of the radio waves emitted from the antenna 3. The shield members 2 can considered to be a pair of concave radio wave reflective surfaces (mirrors).

As shown in FIG. 1, the antenna 3 is located between the aisle and one of the first reflective surface 211 or the second reflective surface 221 of the pair of shield members 2. The antenna 3 transmits and receives radio waves for communicating with the wireless tag at the radiation surface 31. Specifically, the antenna 3 radiates a radio wave (e.g., a tag interrogation signal) from a radiation surface 31 thereof and receives a radio wave (e.g., a tag response signal) from a wireless tag that responds to the radiated radio wave from the antenna 3. For example, the antenna 3 has a plate shape or a rod shape. The antenna 3 radiates a radio wave from the radiation surface 31 (or other element) at an intensity and timing corresponding to the supplied power to the antenna 3. The antenna 3 also receives radio waves emitted by other devices (for example, a wireless tag) at the radiating surface 31 (or other element).

In general, if a parabolic reflective surface is being used to converge radio waves at a focal position of an antenna or to provide directivity to radio waves emitted from the antenna, the radiation surface 31 of the antenna 3 can be provided facing the reflective surface (e.g., the first reflective surface 211) on which the antenna 3 is mounted. In other examples, the radiation surface 31 can be, as illustrated in FIG. 1, on the side of the antenna 3 facing the aisle (reading area R). In the wireless tag reader 1 according to the present embodiment, the concave reflective surfaces provided by the pair of shield members 2 reflect the radio waves emitted from the antenna 3 such that the radio waves stay inside the reading area R. In general, an antenna 3 can be mounted on either one of the shield members 2.

As shown in FIG. 1, the antenna 3 is disposed outside the reading area R. Specifically, the antenna 3 is between the first reflective surface 211 and the aisle. In a case where the first shield plate 21 has a parabolic shape, the antenna 3 can be disposed between the first reflective surface 211 and the first focus FA. The antenna 3 is not located at the first focus FA or the second focus FB.

In another instance, the antenna 3 may be disposed between the second reflective surface 221 and the aisle. In this case, the antenna 3 is between the second reflective surface 221 and the second focus FB. The antenna 3 is not located at the first focus FA or the second focus FB. In some examples, antennas 3 may be between the first reflective surface 211 and the reading area R and also between the second reflective surface 221 and the reading area R.

The read module 4 reads data stored in the wireless tag via signals transmitted to the antenna 3 from the wireless tag. The read module 4 is electrically connected to the antenna 3 in this example. The read module 4 acquires data from a memory that is built into the wireless tag. The read module 4 acquires data from a wireless based on the output of a signal (interrogation signal) from the antenna 3 causing the wireless tag to respond with a signal (response signal) that can be received by the antenna 3. As an example, the read module 4 can be disposed on a rear surface of the antenna 3, that is a surface opposite the radiation surface 31 of the antenna 3. The read module 4 is, for example, a printed circuit board on which various chips that perform functions of the read module 4 are attached.

Figure 2:
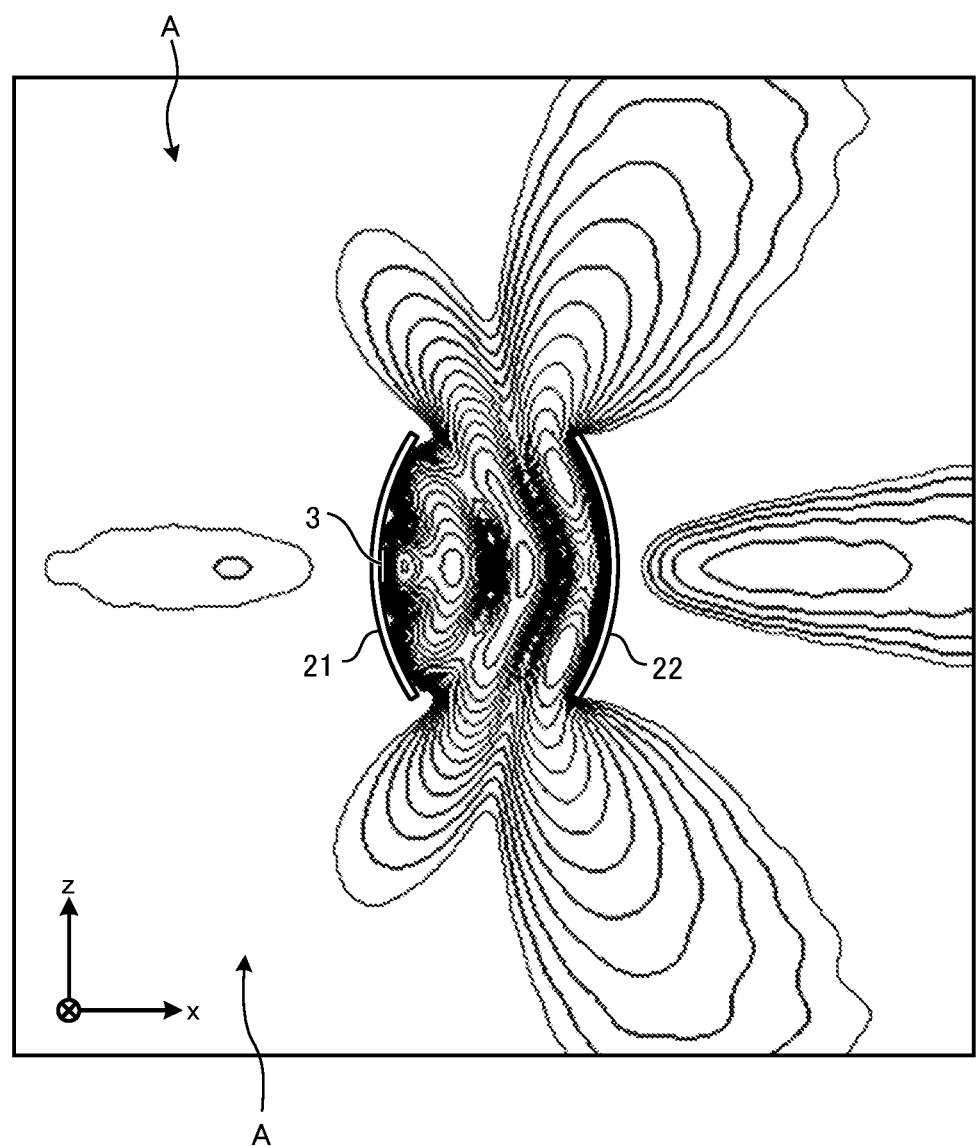
FIG. 2 is a diagram of a radio wave intensity distribution of a wireless tag reader according to a first embodiment.

FIG. 2 is a diagram depicting an analysis of the radio wave intensity distribution of the wireless tag reader 1 according to the first embodiment. By providing the pair of shield members 2 (each of which is formed in a concave shape), the radio waves emitted from the antenna 3 can be reflected toward a predetermined area (e.g., the first focus point FA or the second focus point FB) near the center of the aisle. Therefore, as shown in FIG. 2, the intensity of the radio waves leaking from the reading area R into the region A outside the shield members 2 can be reduced, particularly on the side (the first shield plate 21, in this example) where the antenna 3 is provided.

According to the wireless tag reader 1 of the first embodiment, since the reflective direction of the radio wave is concentrated in the predetermined region at the center of the aisle between the pair of shield members 2, it is possible to reduce the leakage of the radio wave to the outside of the reading area R. Therefore, even when the output intensity of the radio wave is increased in order to increase the reading rate of tagged items, it is possible to reduce the risk of reading a non-target wireless tag located outside the reading area R. In addition, increases in cost that might otherwise be required to achieve similar results by the use of a radio wave absorber material or the like can be suppressed.

Second Embodiment

For a wireless tag reader 1, it is preferable that as much of radio wave energy emitted from the antenna 3 as possible be concentrated between the pair of shield members 2 in the reading area R. The parabolic shape of each of the shield members 2 can be increased in size that to cause more radio waves radiated from the antenna 3 to enter the reading area R. However, the size of the shield members 2 may be practically limited by such matters as installation place size and manufacturing and installation costs associated with larger components.

Figure 3:
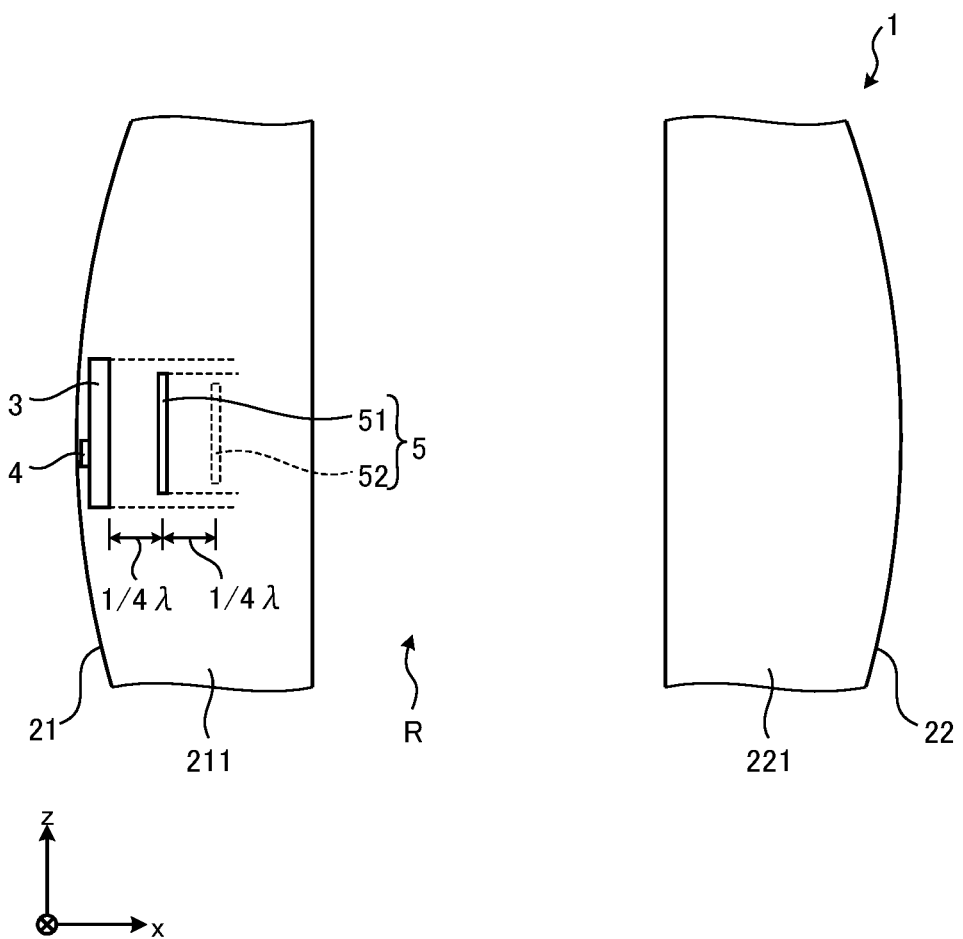
FIG. 3 depicts a wireless tag reader in a partial-cross sectional view according to a second embodiment.

Therefore, the wireless tag reader 1 of a second embodiment is configured to improve directivity of the radio wave emitted from the antenna 3. FIG. 3 depicts an example configuration of the wireless tag reader 1 in a partial cross-sectional view according to the second embodiment. As shown in FIG. 3, the wireless tag reader 1 further includes a wave director 5.

The wave director 5 is disposed between the antenna 3 and the reading area R in the aisle and controls the directivity of the radio waves emitted from the antenna 3. The operating principle of the wave director 5 is similar to that of a Yagi-Uda antenna. In the example configuration as shown in FIG. 3, the wave director 5 includes a first wave directing element 51. The first wave directing element 51 is a rod-shaped metal member. The first wave directing element 51 is similar to a dipole antenna in this context. The first wave directing element 51 is slightly shorter than full width of the antenna 3. The first wave directing element 51 is placed at a position separated from the antenna 3 by a ¼ wavelength distance for a radio wave emitted from the antenna 3. The antenna 3 can be referred to as a radiator or an excitation element in this context.

The first wave directing element 51 radiates a radio wave in response to the radio wave from the antenna 3. The radio wave from the first wave directing element 51 has a phase delayed by a half wavelength from the radio wave from the antenna 3. Therefore, due to interference between the radio wave from the antenna 3 and the radio wave from the first wave directing element 51, both radio waves are strengthened along the direction from the antenna 3 to the wave directing element 51. On the other hand, both radio waves are weakened along the direction from the first wave directing element 51 toward the antenna 3. Thus, the wave director 5 improves the directivity of the radio waves emitted from the antenna 3.

The wave director 5 may further include a second wave directing element 52 as indicated by a broken line in FIG. 3. Likewise, the wave director 5 may include three or more wave directing elements. Each wave directing element being a rod-like metal member arranged away from the antenna 3 at an interval of a ¼ wavelength multiple of a radio wave emitted from the antenna 3. The farther away each wave directing element is from the antenna 3, the shorter in length each wave directing element becomes (e.g., first wave directing element 51 is shorter than the second wave directing element 52, etc.).

The wave director 5 may be fed with a phase delay of a half wavelength with respect to the antenna 3. In this case, the length of each of the first and second wave directing elements 51 and 52 is the same as that of the antenna 3. Even in this configuration, the wave director 5 radiates a radio wave whose phase is delayed by a half wavelength from the radio wave from the antenna 3.

The wave director 5 may further include a reflective element such as a reflector (not separately depicted). The reflective element may be a rod-shaped metal member similar to a dipole antenna. The reflective element may be slightly longer than one side of the antenna 3. Alternatively, the reflective element may have the same length as one side of the antenna 3 and may be fed with a phase advanced by a half wavelength with respect to the antenna 3. The reflective element may be arranged on the opposite side of the first wave directing element 51 with respect to the antenna 3 at a position separated by a length of ¼ wavelength of radio waves radiated from the antenna 3.

Figure 4:
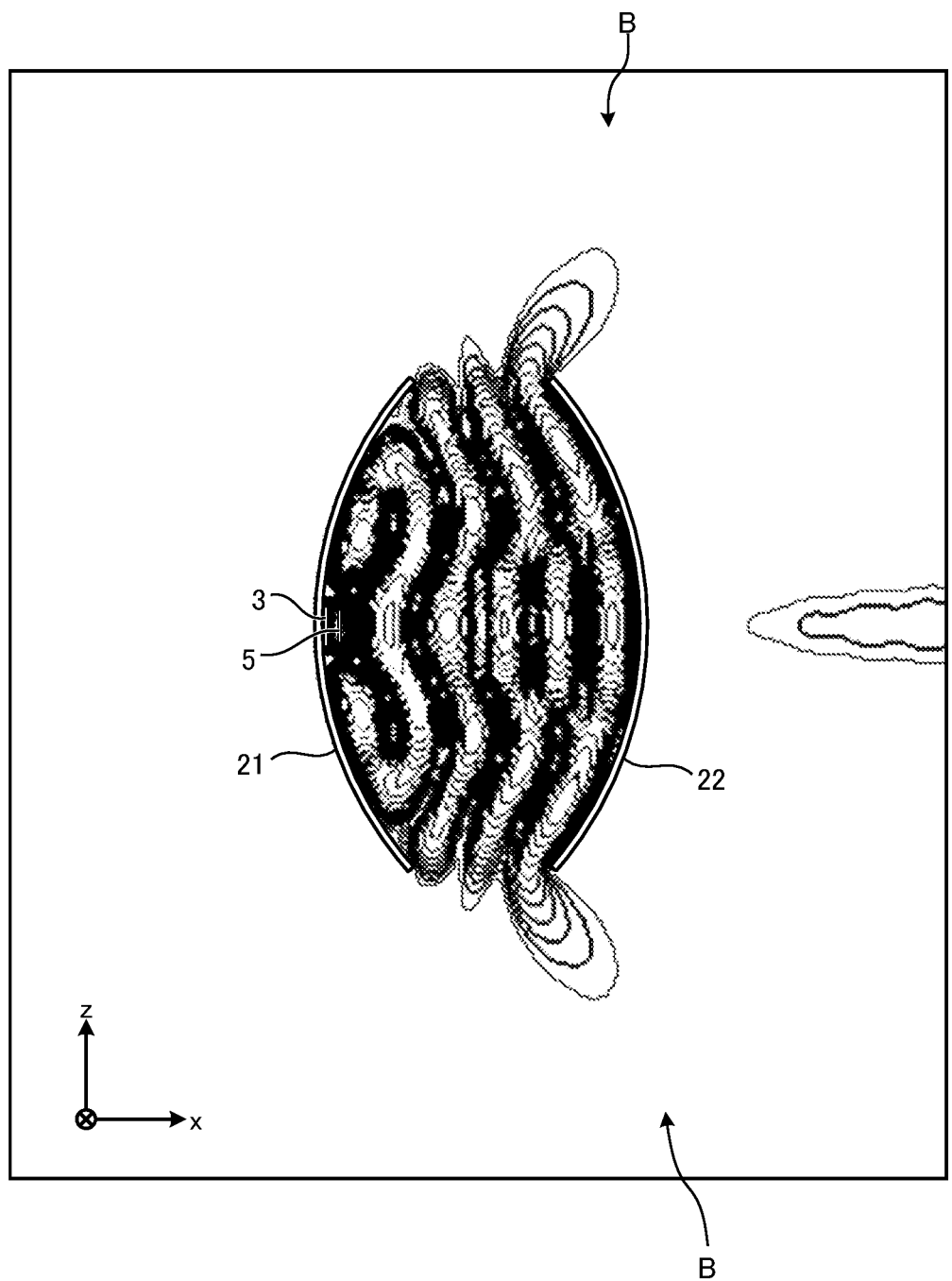
FIG. 4 is a diagram of a radio wave intensity distribution of a wireless tag reader according to a second embodiment.

FIG. 4 is a diagram depicting an analysis of the radio wave intensity distribution of the wireless tag reader 1 according to the second embodiment. By providing the wave director 5 to the wireless tag reader 1, the directivity of the radio wave from the antenna 3 can be narrowed. Therefore, as shown in FIG. 4, for example, the radio wave intensity of the radio wave leaking from the reading area R to the area B around the second shield plate 22 facing the first shield plate 21 on which the antenna 3 is provided can be reduced further.

According to the wireless tag reader 1 of the second embodiment, since the directivity of the radio wave radiated from the antenna 3 can be narrowed, the radio wave leakage to the outside of the reading area R can be further reduced.

Furthermore, since the directivity of the radio wave radiated from the antenna 3 can be narrowed, the leakage of the radio wave to the outside of the reading area R can be reduced without enlarging the parabolic shape of the shield members 2. Hence, the wireless tag reader 1 can be reduced while more radio waves can enter the reading area R between the shield members 2.

Third Embodiment

In general, some part of the radio waves hitting a metal object will not be fully reflected by the metal object and some may pass around the metal object to the back side of the metal object. Thus, in the wireless tag reader 1 as described above, some part of the radio waves incident on the shield members 2 (which are metal objects) may pass to the back side of the shield members 2, thereby leaking from the reading area R.

Figure 5:
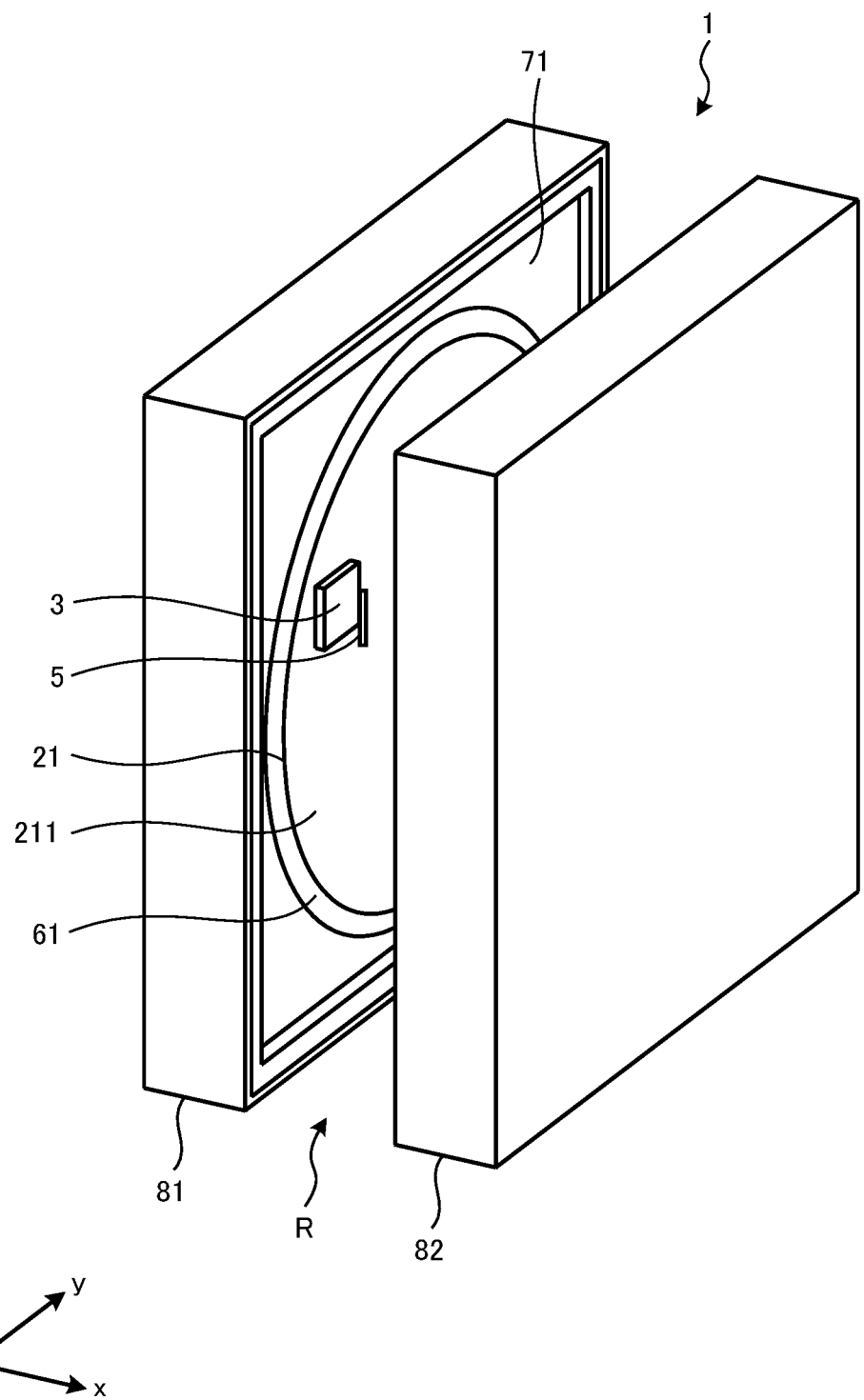
FIG. 5 depicts a wireless tag reader in a perspective view according to a third embodiment.
Figure 6:
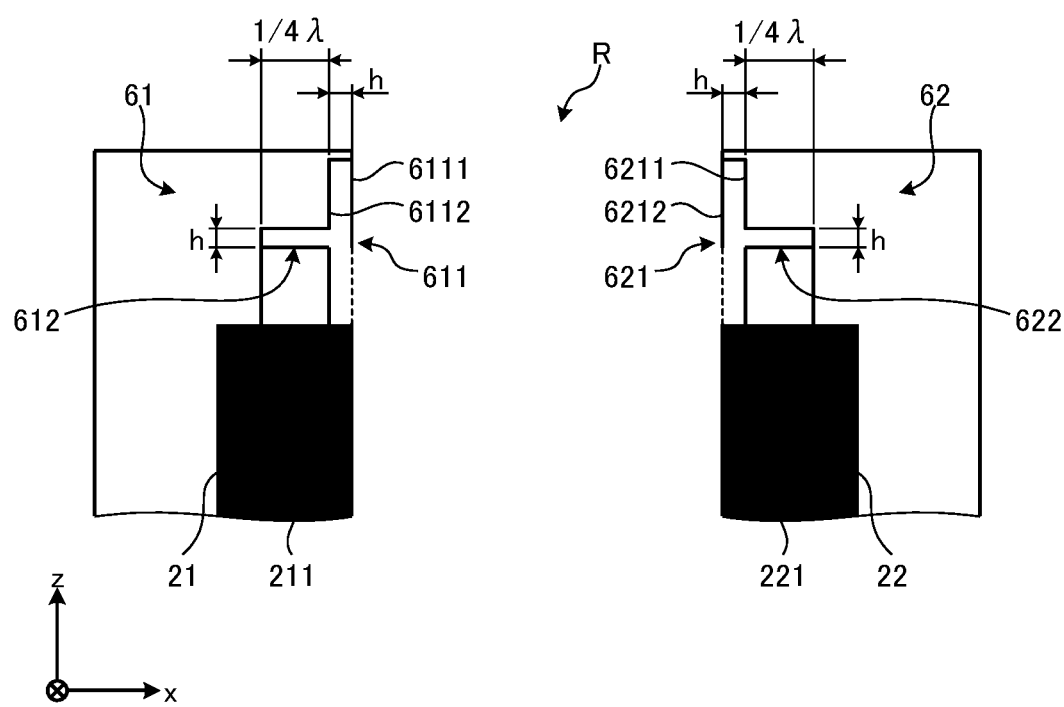
FIG. 6 depicts a wireless tag reader in a partial cross-sectional view according to a third embodiment.

According to a third embodiment, the wireless tag reader 1 is configured to prevent or mitigate propagation of the radio wave radiated from the antenna 3 to the outside of the reading area R. FIG. 5 depicts an example configuration of the wireless tag reader 1 in a perspective view according to the third embodiment. FIG. 6 depicts an example configuration of the wireless tag reader 1 in a partial cross-sectional view according to the third embodiment.

As shown in FIGS. 5 and 6, the wireless tag reader 1 further includes a first choke structure 61 and a second choke structure 62 that are disposed at outer edges of the respective shield members 2. The first and second choke structures 61 and 62 are configured in a manner similar to other structures used for shielding radio waves in a microwave oven, for example. The first and second choke structures 61 and 62 may also be referred to as first and second wave chokes herein.

The first choke structure 61 is disposed at an outer edge portion of the first shield plate 21. The outer edge portion of the first shield plate 21 faces the second shield plate 22 across the reading area R. In the example configuration, the first choke structure 61 includes a first waveguide 611 and a first groove 612. The first waveguide 611 includes a flat plate 6111 and a flat plate 6112 that are separated from each other by a length h. The position of the flat plate 6111 in X-direction as shown in FIG. 6 coincides with that of the outer edge of the first shield plate 21. The flat plate 6112 is provided with a first groove 612 therein. The width of the first groove 612 in Z-direction as shown in FIG. 6 is the same as the length h. The depth of the first groove 612 in X-direction is a length of ¼ wavelength of the radio wave radiated from the antenna 3. In another embodiment, the configuration of the first choke structure 61 may be different from that in the present embodiment so long as the desired effect of shielding the radio wave can be achieved. For example, the depth of the first groove 612 may be greater by an integral multiple of a length of a half wavelength of the radio wave radiated from the antenna 3.

If the radio wave radiated from the antenna 3 propagates along the outer edge of the first shield plate 21, such radio wave enters the first waveguide 611 of the first choke structure 61. At least part of the radio wave that has entered the first waveguide 611 further enters the first groove 612. The radio wave reflected by the first groove 612 interferes with the radio wave on the first waveguide 611 at a position where the radio wave has entered the first waveguide 611 (that is an intersection with the first waveguide 611). The phase of the radio wave that is reflected by the first groove 612 and then travels through the first waveguide 611 in a direction away from the first shield plate 21 is different from the phase of the radio wave that is incident on the first waveguide 611 by a half wavelength. Therefore, according to the first choke structure 61, it is possible to shield the radio wave that goes around from the outer edge portion of the first shield plate 21 to the back side of the first shield plate 21.

The second choke structure 62 is disposed at an outer edge portion of the second shield plate 22. Since the second choke structure 62 is substantially the same as the first choke structure 61, detailed descriptions thereof are omitted herein. The second waveguide 621 corresponds to the first waveguide 611. The flat plate 6211 corresponds to the flat plate 6111. The flat plate 6212 corresponds to the flat plate 6112. The second groove 622 corresponds to the first groove 612.

As shown in FIG. 5, the first shield plate 21 and the first choke structure 61 are disposed inside a first housing 81. The second shield plate 22 and the second choke structure 62 are disposed inside a second housing 82. Between the first housing 81 and the second housing 82 is the reading area R in the aisle, through which a tagged article passes. The wireless tag reader 1 according to the third embodiment is disposed inside each of the housings 81 and 82 such that elements, members, and the like of the wireless tag reader 1 are accommodated and supported therein. The wireless tag reader 1 of the first and second embodiments may be provided in the housings 81 and 82 in a similar manner to that of the third embodiments.

Figure 7:
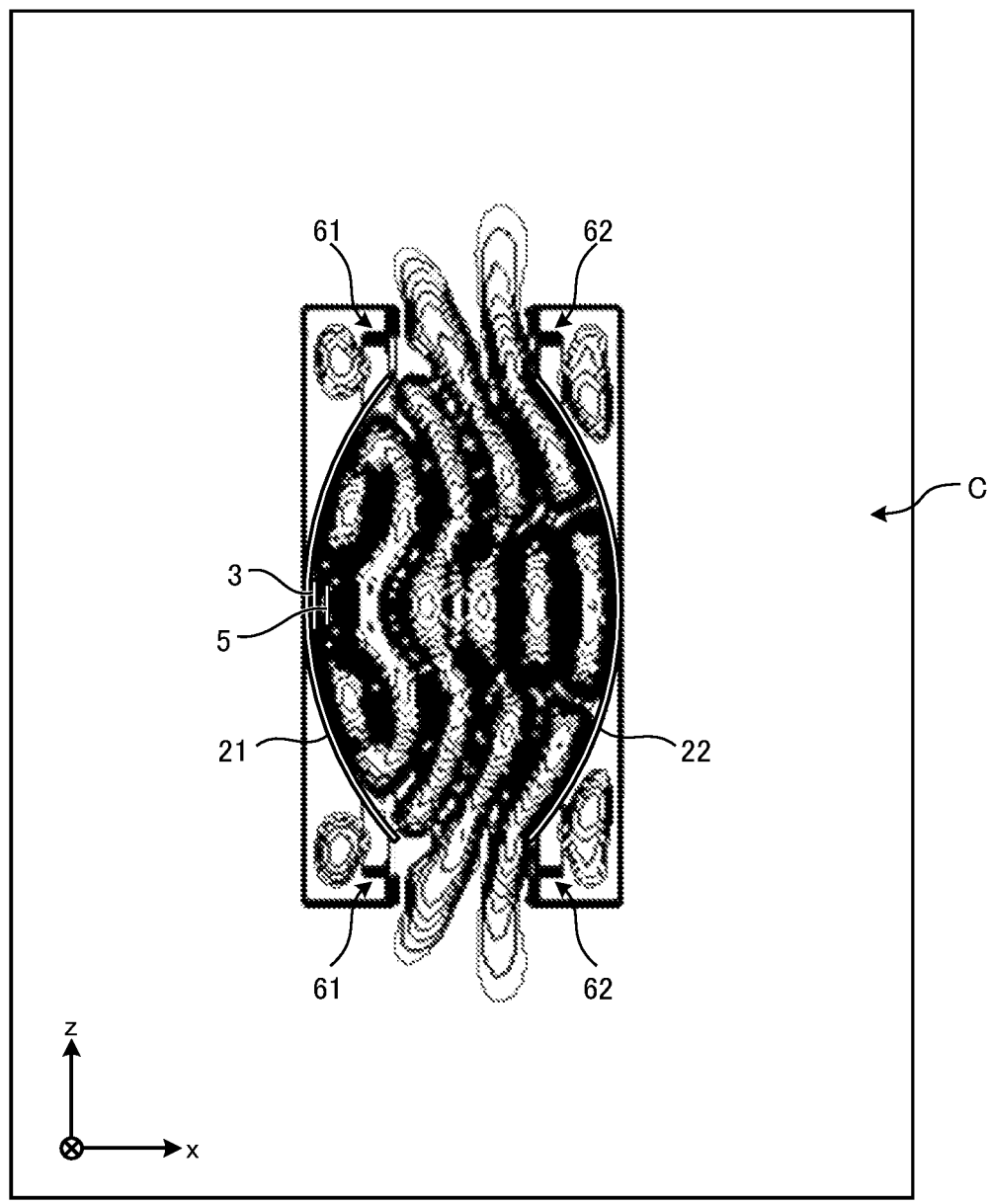
FIG. 7 is a diagram of a radio wave intensity distribution in a wireless tag reader according to a third embodiment.

FIG. 7 is a diagram depicting an analysis of the radio wave intensity distribution for the wireless tag reader 1 according to the third embodiment. By providing the first choke structure 61 and the second choke structure 62, it is possible to reduce the "wraparound" propagation of the radio wave from the antenna 3 to the back side of the shield members 2. Therefore, as shown in FIG. 7, for example, the intensity of the radio wave that leaks from the reading area R to an area C on the back side of the second shield plate 22 facing the first shield plate 22 on which the antenna 3 is provided can be further reduced.

As described above, according to the wireless tag reader 1 of the third embodiment, it is possible to further mitigate the leakage of the radio waves radiated from the antenna 3 to the outside of the reading area R, thereby more effectively confining the radio waves in the reading area R.

While the example configuration of the wireless tag reader 1 of the third embodiment includes the first choke structure 61 and the second choke structure 62 added to the wireless tag reader 1 of the second embodiment, combination of the example embodiments is not limited to this. The present embodiments can be combined in any appropriate fashion. For example, the wireless tag reader 1 of the first embodiment may further include a first choke structure 61 and a second choke structure 62.

In each of the present embodiments, in a case where the wireless tag reader 1 is installed in a warehouse, a store, or the like, the pair of shield members 2 may be disposed on left and right sides (that is on both side surface sides) or on upper and lower sides (that is on ceiling and floor surface sides) of the space where the wireless tag reader 1 is installed. In another instance, the wireless tag reader 1 may include two pairs of shield members 2, e.g., upper, lower, left, and right shield members 2. In the case where the shield plate is disposed on a lower surface (that is on a floor surface), the uppermost floor surface may be formed by a flat member transparent to radio waves, and a concave shield plate that faces upward may be disposed below the floor surface. In still another instance, the wireless tag reader 1 may include three pairs of shield member 2, e.g., upper, lower, left, right, front, and rear shield members 2. In this case, at least two shield plates of the two pairs of shield members (e.g., front, rear, left, and right shield members 2) may be provided with a plurality of openings through which tagged commodities or articles can pass.

In each of the embodiments described above, some part of the wireless tag reader 1 may be installed below the floor surface. In a case where a belt conveyor that conveys tag-attached articles along the aisle of the gate is also installed on the floor surface, a conveyor surface of the belt conveyor may be provided at or near the height of the antenna 3, or at or near the center of the pair of shield members 2 where the reading area R is located.

While the first and second shield plates 21 and 22 are depicted as symmetrical with respect to the reading area R, the first and second shield plates 21 and 22 may be asymmetrically arranged or formed with respect to the reading area R in other examples. For example, one of the reflective surfaces of the shield members 2, that is, one of first reflective surface 211 or second reflective surface 221 can be formed in a parabolic shape, whereas the other reflective surface can have a different shape. The shape of the other reflective surface may be, for example, a different parabolic shape, another concave type shape, such as a quadrangular pyramid or a part of a cone shape, or a flat plate shape can be used. In these configurations, the antenna 3 may be provided on the reflective surface formed in the parabolic shape, may be provided on the reflective surface formed in another concave shape, or may be provided on both reflective surfaces.

In the wireless tag reader 1 according to each of the above-described embodiments, the first housing 81 may be further provided with a first absorbent member 71 as depicted in FIG. 5. Similarly, the second housing 82 may be further provided with a second absorbent member (not separately depicted but corresponding to the first absorbent member 71). Such absorbent members may be made of a material that absorbs radio waves radiated from the antenna 3. Examples of such absorbent members include but not limited to a dielectric loss type radio wave absorber, a resonance type radio wave absorber, and a material capable of canceling radio waves by having an Electromagnetic Band Gap (EBG) type structure. The absorbent members can be appropriately selected and used for the first and second housings 81 and 82.

According to the present embodiments, it is possible to provide the wireless tag reader 1 capable of reducing the radio wave leakage to the outside of the reading area R in the aisle of a gate between the shield members 2.

The present embodiments can also be implemented as a device that limits a reception area of a beacon device that uses Bluetooth® Low Energy (BLE) communication or the like. In such a case, it is possible to improve accuracy in providing information corresponding to a position of the beacon device.

The present embodiments can also be implemented as a device that reduces leakage of an electromagnetic wave other than a radio wave, such as visible light having a wavelength in a visible region and infrared light having a wavelength in an infrared region. In such a case, it is possible to improve energy efficiency in lighting, heating, or the like.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless tag reader, comprising:
    a first shield member and a second shield member facing each other across a reading area through which a wireless tag attached to an article can pass, each of the first and second shield members comprising a reflective surface configured to reflect radio waves incident thereon toward the area;
    an antenna between the reading area and the reflective surface of at least one of the first and second shield members, the antenna configured to radiate and receive radio waves for communicating with the wireless tag;
    a reader configured to read data stored in the wireless tag based on radio waves received from the wireless tag by the antenna; and
    a wave director between the antenna and the reading area, the wave director configured to control directivity of radio waves from the antenna, wherein
    the wave director comprises a first wave directing element configured to radiate a first radio wave in response to a radio wave from the antenna.

2. The wireless tag reader according to claim 1, wherein the reading area is in an aisle between the first and second shield members.

3. The wireless tag reader according to claim 1, wherein the reflective surface of at least one of the first and second shield members is a concave surface configured to reflect radio waves to a focal point in the reading area.

4. The wireless tag reader according to claim 1, wherein the reflective surface of at least one of the first and second shield members has a parabolic shape.

5. The wireless tag reader according to claim 1, wherein the reflective surface of the first shield member and the reflective surface of the second shield member are symmetric to each other with respect to the reading area.

6. The wireless tag reader according to claim 1, wherein the antenna comprises a radiation surface facing the reading area, the radiation surface configured to radiate radio waves to the reading area and receive radio waves from the wireless tag.

7. The wireless tag reader according to claim 6, wherein the radiation surface is further configured to perform multi-reflection of the radio wave.

8. The wireless tag reader according to claim 1, wherein the first wave directing element is spaced from the antenna by a distance equal to ¼ wavelength of the radio wave from the antenna.

9. The wireless tag reader according to claim 1 wherein the first radio wave from the first wave directing element has a phase delayed by a half wavelength from the radio wave from the antenna.

10. The wireless tag reader according to claim 1 wherein the wave director further comprises a second wave directing element spaced from the first second wave directing element by a distance equal to ¼ wavelength of the radio wave from the antenna.

11. The wireless tag reader according to claim 1, further comprising:
    a choke structure at an outer edge portion of one of the first and second shield members, the choke structure configured to suppress propagation of radio waves from the antenna to a back side of the one of the first and second shield members.

12. The wireless tag reader according to claim 11, wherein the choke structure comprises a wave guide into which radio waves enters and a groove by which the radio waves from the wave guide are reflected back to the wave guide.

13. A wireless tag reader, comprising:
a first shield member comprising a first concave reflective surface;
a second shield member comprising a second concave reflective surface and facing the first shield member across an aisle of a tag gate, each of the first and second concave reflective surfaces configured to reflect radio waves toward a tag reading area in the aisle of the tag gate;
an antenna configured to radiate radio waves toward the tag reading area and receive radio waves from a wireless tag in the tag reading area; and
a wave choke configured to suppress propagation of radio waves from the antenna to a back side of the one of the first and second shield members.

14. The wireless tag reader according to claim 13, further comprising:
a wave director configured to direct radio waves from the antenna toward the tag reading area.

15. The wireless tag reader according to claim 13, wherein the antenna is between the tag reading area and the concave reflective surface of the at least one of the first and second shield members.

16. The wireless tag reader according to claim 13, wherein each of the first and second reflective surfaces has a parabolic shape.

17. The wireless tag reader according to claim 14, wherein the wave director comprises a first wave directing element configured to radiate a first radio wave in response to a radio wave from the antenna.

18. The wireless tag reader according to claim 17, wherein the first wave directing element is spaced from the antenna by a distance equal to ¼ wavelength of the radio wave from the antenna.

19. A wireless tag reader, comprising:
an antenna configured to transmit and receive signals to and from a wireless tag in a tag reading area;
a pair of shield members with the tag reading area therebetween, each shield member of the pair of shield members comprising a reflective surface configured to reflect signals from the antenna to a focal point within the tag reading area;
a wave directing element configured to radiate a first radio wave in response to a radio wave from the antenna; and
a reader configured to read data of the wireless tag based on a signal received from the wireless tag by the antenna, wherein
the antenna is between the tag reading area and at least one of the first and second reflective surfaces, and
the wave directing element is between the antenna and the tag reading area.

20. The wireless tag reader according to claim 19, further comprising:
a choke structure at an outer edge portion of one of the pair of shield members, the choke structure configured to suppress propagation of radio waves from the antenna to a back side of the one of the pair of shield members.

* * * * *